3,219,454
LOW CALORIE DIET
Hartley W. Howard, Hastings on Hudson, Walter B. Jacobsen, Valley Stream, Jane Hsueh, New York, and Raymond C. Selby, Brooklyn, N.Y., and Telford W. Workman, Hamden, Conn., assignors to The Borden Company, New York, N.Y., a corporation of New Jersey
No Drawing. Filed June 15, 1961, Ser. No. 117,296
5 Claims. (Cl. 99—28)

This invention relates to a liquid food suitable for use as a low calorie diet. It is an improvement upon foods of the same general class in desirability of flavor, absence of separation, settling and objectionable after taste. It provides a high ratio of carbohydrate to total calories that increases the removal and metabolism of body fat when the food is consumed as the sole source of calories.

Briefly stated the invention comprises a liquid food product that is a water dispersion of carbohydrates, protein and fat providing 475-600 or more calories from carbohydrates for 900 total calories provided in a quart of the liquid food of the normal concentration. In the most satisfactory embodiment, the carbohydrate content consists of several water soluble carbohydrates of varying rates of assimilation in the body, so that their energy is released over a widened period of time as shown by varying rates of intestinal absorption of the different carbohydrates. Thus lactose is used along with sucrose, water soluble dextrins, dextrose and maltose in proportions in the order named, with lactose the largest.

In addition to the other advantages, the high proportion of lactose is considered to promote the development in the alimentary canal of flora which offset in part at least the shortage of bulking ingredients found in usual diets of this kind.

In addition to the components stated, our food contains usual types of flavoring materials, mineral and vitamin supplements, and for best results guar gum and carrageenin, either alone or mixed, or other viscosity increasing or thickening agents commonly used in food products.

The liquid is stable when refrigerated or frozen. It is substantially non-settling under refrigeration for several days at least. It can be spray dried to powder form for use after reconstitution with water.

In a blind taste panel test, our vanilla flavored liquid food was compared with a commercial food of the same class and like flavor containing substantially less carbohydrate for 100 parts of fat and containing also more and different kind of protein from that which we use. Of the panel, 87% preferred our food on the basis of flavor, viscosity, general appearance, sweetness level and absence of objectionable aftertaste; only 3% preferred the other commercial food; and 10% had indeterminate findings. With the chocolate flavored materials the figures in order were 99%, 0% and 10%. A test group, using a quart a day (900 calories) of our food, lost on the average a half pound a day in weight for 2 weeks. Extended sole use of the food as a diet by one having any idiosyncrasy of metabolism or pathological condition should be made, however, only on the advice of a physician.

In an animal test, litter mate rats were fattened on a full diet and then separated into two groups. The two groups were then fed for a period of 14 days on different reducing diets each providing a third of the calorific value of the previous fattening or full diet. One of the reducing diets (Diet 1) was the same as the full diet but the intake was restricted to a third of that which had been voluntarily consumed. The other (Diet 2) was our food provided at a level to furnish also a third of the calories previously consumed voluntarily. The average loss in weight of the two groups of rats fed on the different reducing regimens was approximately the same, 87 grams Diet 1 and 92 grams on Diet 2. Carcass analyses showed, however, that the loss of fat from the bodies was much greater on our Diet 2 than on the other, the loss of protein was less, and there was an actual gain in total body minerals (ash) as compared to a loss of minerals on the conventional Diet 1. The data follow:

TABLE 1

| Carcass Component | Average Weight per Rat, gms. | | |
|---|---|---|---|
| | At Start | Diet 1 After 14 days | Diet 2 After 14 days |
| Total body | 440 | 353 | 349 |
| Fat | 66 | 30 | 17 |
| Water | 260 | 223 | 228 |
| Protein | 99 | 85 | 87 |
| Ash | 15 | 15 | 17 |

The animals on our Diet 2 lost 49 grams of fat as compared with only 36 grams lost by those on Diet 1. These losses correspond, respectively, to 74% and 46% of the carcass fat at the start of the reducing regimen.

The fat used in the food of the invention is any of the common edible fats. We prefer butter fat although other fats may be substituted as, for example, soybean or corn oil either in refined or partially hydrogenated condition or both if the particular advantages of butter fat are not desired in the finished product.

The protein used must be water dispersible so as to prevent sedimentation in the liquid food and facilitate reconstitution in case the product is distributed in power form. Furthermore the protein should be relatively high in content of lysine and other essential aminoacids some of which are low in cereal proteins, in order that our relatively small amount of the protein, as compared to that of other compositions of this type, will provide the necessary amounts of the aminoacids essential for human nutrition. We have found no protein economically available that is as satisfactory for this purpose and as acceptable in palatability as the proteins of milk, that is, casein, lactoglobin and lactalbumin which we ordinarily use jointly as they occur naturally in milk. While other animal proteins such as those of meat or egg would meet the requirement as to the essential aminoacids, there are other disadvantages in substituting such other proteins. Additional proteins, e.g., soy or peanut protein, if fortified where necessary by certain essential aminoacids to make the proportions of such acids about the average found in body proteins, would meet also the one requirement but not the palatability and other features such as lack of settling necessary for preferential acceptance. If the soy or peanut proteins are used they are in any case first degraded or partially hydrolyzed to water soluble or dispersible form and used in conjunction with at least an equal weight of milk protein.

The flavoring, vitamins, minerals, and any other enriching components are of usual kind and in amounts meeting authoritative dietary standards.

Table 2 shows suitable proportions of the principal components used, in one column by weight and in the last column as calories provided.

TABLE 2

| Component of Food | Per Quart of Liquid Food (900 Calories) | |
|---|---|---|
| | Grams | Calories Provided |
| Protein | 43–60 | 172–240 |
| Total Carbohydrate | 120–150 | 480–600 |
| Lactose | 60–90 | 240–360 |
| Sucrose | 0–45 | 0–180 |
| Dextrins | 5–50 | 20–200 |
| Dextrose and Maltose | 2–20 | 8–80 |
| Fat | 15–20 | 135–180 |

Suitable proportions are 650–1000 parts by weight of the carbohydrates and 300–600 of protein for 100 of fat.

Some shifting within and to a limited extent without these ranges is permissible to suit the taste of the consumer.

Sucrose, as in the amount of about 20–45 parts per quart of the food, is ordinarily used with chocolate and other flavors requiring such sweetening but omitted or reduced greatly in amount for such flavors as vanilla or tomato.

Table 3 shows a composition recommended for commercial use, to which there are to be added the flavoring material, vitamins, mineral supplements and stabilizing gums.

TABLE 3

| Components | Grams used | Gms. for 100 Fat | Calories Provided | |
|---|---|---|---|---|
| | | | No. | Percent of Total |
| Protein | 58 | 341 | 230 | 25.6 |
| Carbohydrates, total | 130 | 765 | 520 | 57.7 |
| Lactose | 85 | 500 | 340 | 37.8 |
| Sucrose | 28 | 165 | 112 | 12.4 |
| Dextrins | 13 | 76 | 52 | 5.8 |
| Dextrose and maltose | 4 | 24 | 16 | 1.8 |
| Fat | 17 | 100 | 150 | 16.7 |
| Total | 205 | | 900 | 100 |

For the chocolate flavored food, a part of the fat component of the food composition in Table 2 is supplied by the cocoa used, as by Holland-Dutch or other chocolate flavoring base of fat content 10%–12%, in the proportion of about 1 lb. for 100 pounds of the finished food on the dry basis.

The edible stabilizing gum used to decrease separation and settling from the food in aqueous dispersion is of vegetable origin. It is supplied to advantage in extracted form as in a commercial food grade of carrageenin, guar, or locust bean gum or of further processed material such as sodium alginate and sodium carboxymethyl cellulose.

The gum is used in the amount of 0.1%–0.35% of the total solids and ordinarily 0.15%–0.25%. The latter range corresponds to about 0.3–0.5 gms. of the gum per quart of the food weighing 1020 gms. of solids content including minerals about 220 gms. Particularly satisfactory results are obtained in the use of the gum when carrageenin and guar gums are used, either alone or jointly in amount to raise the viscosity of the food to about 75–250 cps. at 45° F. and suitably to within the range 100–150 cps. for the food made with chocolate flavor and 110–170 for the vanillin flavored foods. This determination is made on the food, after admixture of the gum or gums, homogenization, pasteurization, and then refrigeration of the whole for 16 hours or longer, with a Brookfield R.V.F. Viscosimeter with a No. 2 spindle at 20 r.p.m., at 40°–50° F., as at 45°.

In all cases the high ratio of total carbohydrate to fat and the gradation of the carbohydrates, between the quickly absorbable and the more slowly absorbable materials such as the dextrins, will be noted.

TABLE 4

*Suitable Content of Minor Components*

| Component used: | | Amount per quart of liquid food (900 calories) |
|---|---|---|
| Calcium | mg | 2,000 |
| Magnesium | mg | 200 |
| Phosphorus | mg | 1,600 |
| Potassium | mg | 2,300 |
| Sodium | mg | 970 |
| Cobalt | mg | 0.001 |
| Copper | mg | 0.50 |
| Fluorine | mg | 0.27 |
| Iodine | mg | 0.35 |
| Iron | mg | 12 |
| Manganese | mg | 0.03 |
| Molybdenum | mg | 0.01 |
| Zinc | mg | 6.4 |
| Linoleic acid | mg | 270 |
| Arachidonic acid | mg | 170 |
| Ascorbic acid | mg | 75 |
| Biotin | mg | 0.06 |
| Choline | mg | 218 |
| Folic acid | mcg | 3.8 |
| Inositol | mg | 218 |
| Niacin | mg | 20 |
| Pantothenic acid | mg | 5.9 |
| Pyrodoxine | mg | 0.8 |
| Riboflavin | mg | 3,0 |
| Thiamin | mg | 1.5 |
| Vitamin $B_{12}$ | mcg | 9.4 |
| Vitamin A | I.U. | 5,000 |
| Vitamin D | I.U. | 400 |
| Vitamin E | mg | 0.27 |
| Vitamin K | D.G. u | 460 |

The minor components or supplementary materials, when used, are added in any usual non-toxic form of food grade. Thus the metals, except for the iron in the amount shown, the linoleic and arachidonic acids, and some of the vitamins may be supplied by skim milk. Others may be added in compounds that are non-toxic, edible, and permissible in foods. Soluble compounds are preferably selected when available. When no soluble source of the supplement can be had, as in the case of vitamins A and D, then it is used in conjunction with any known and permitted solubilizing or emulsifying agent therefor. Examples of metal salts that meet the requirements are sodium (selected metal) pyrophosphate, e.g., sodium ferric pyrophosphate, other phosphates, chlorides, citrates and lactates, all in amounts not above the officially set tolerances. Examples of other source materials are thiamine hydrochloride, vitamin A palmitate with about an equal weight of mixed glycerol monooleate and propylene glycol, lecithin or like emulsifiers and butter fat, the latter providing the unsaturated linoleic and arachidonic acids.

The invention will be further illustrated by the following specific examples of the practice of it. In these examples and elsewhere herein proportions are expressed as parts by weight unless specifically stated to the contrary.

*Example 1.*—A quart of liquid food of caloric value 900 per quart, designed to supply the necessary components for a day's diet in conjunction with the fat to be metabolized from the body of the human consumer, is made on the following formula, skim milk being the medium for the dispersion.

TABLE 5

| Component | Amount | Percent of Daily Human Requirement as Established by U.S. Food and Drug Administration |
|---|---|---|
| Milk protein | 58 gm | |
| Fat | 17 gm | |
| Carbohydrate | 130 gm | |
| Minerals (ash) | 12.7 gm | |
| Vitamin A as palmitate | 5,000 units | 125 |
| Vitamin D | 400 units | 100 |
| Vitamin C as ascorbic acid | 75 mg | 250 |
| Thiamine as hydrochloride | 1.5 mg | 150 |
| Riboflavin | 3.0 mg | 250 |
| Niacin | 20.0 mg | 200 |
| Iron as Fe* | 12.0 mg | 120 |
| Calcium | 2.0 gm | 267 |
| Phosphorus | 1.6 gm | 213 |
| Carrageenin | 0.26 gm | |
| Guar gum | 0.14 gm | |

*Iron supplied as sodium ferric pyrophosphate.

Chocolate base flavoring (8% fat) was used in the amount of 14 gm., supplying 1.12 gm. fat. The remainder of the fat (15.88 gm.) was supplied by milk fat as cream containing in glyceride form 0.27 gm. of linoleic acid and 0.17 gm. of arachidonic acid.

The minerals, vitamins and other minor components are of kinds and in the proportions stated in Tables 3 and 4.

The carbohydrate moiety in the food of the formula in Table 4 was approximately as follows: lactose 59%, sucrose 33%, soluble dextrin 6%, and maltose and dextrose 2%. The sucrose was introduced in granulated form. The dextrose, maltose and soluble dextrin were provided by spray dried starch conversion syrup solids. The milk protein, some of the lactose, the calcium, phosphorus and the necessary water are supplied by skim milk and the fat by cream. Additional spray dried milk solids not-fat were admixed to provide additional lactose and protein. The water insoluble vitamins A and D are suitably preemulsified together with a minimum amount of skim milk and an emulsifying proportion of glycerol monooleate or other emulsifying agent of food grade, as in the amount of 0.1%–1% of the weight of the emulsion to be produced. The order, manner and technique and machinery for mixing, homogenizing and pasteurization are conventional in making solutions or dispersions of vitamins and mineral supplements, fat and carbohydrates in fluid milk as in the ice cream or other dairy industry.

*Example 2.*—The procedure and composition of Example 1 are used except that the 58 grams of milk protein are replaced by 38 grams of milk protein and 32 of enzyme hydrolyzed soy protein.

The product so made is satisfactory from the standpoint of calorie content but not as acceptable in other regards as the product made in Example 1.

*Example 3.*—In making other flavors of the product such as vanillin, eggnog, banana, raspberry, or strawberry, the flavoring mixtures that are usual in establishing these particular flavors are substituted for the chocolate in the composition and procedure of Example 1, in amount to give the depth of flavor desired. Minor adjustments in the formula may be made and, if so, are made in manner that will occur to those skilled in this art. Thus correction is made for the fat content (as in cocoa) or absence of fat content in the flavoring composition to be substituted.

*Example 4.*—In making the food with tomato flavor, a tomato pulp as in the form of a puree or paste is incorporated in amount to give the flavor desired, in place of the chocolate flavoring of Example 1.

Changes are necessary, however, in making the tomato product. The pectin content of the tomato is reduced, either by selection of the tomato to be processed to the paste or puree or by any known method for separation of pectin from tomatoes. The pectin is reduced to an amount corresponding to not more than about 0.002–0.02 parts for 100 parts of the liquid food of which the flavoring is to be a part. While no pectin at all is required with the tomato flavoring, it is permissible to use any amount up to that shown as for instance 0.01 to 0.1% of the dry weight of the food. Also the major (calorific) components of the composition are modified somewhat in proportions when the tomato flavoring is the one selected, proportions of such major components in a suitable formula for a quart (220 g. dry weight) of the food being as follows:

Components: Grams used
Protein _____ 58
Carbohydrates, total _____ 130
   Lactose _____ 74
   Dextrins _____ 23
   Dextrose and maltose _____ 8
   From tomato _____ 25
Fat _____ 17

Total _____ 205

The tomato, protein, and fat are included with the components of those classes from all sources in the table above thus reducing correspondingly the amounts required from other sources. The minerals of the tomato are included with minerals from other sources which constitute most of the difference between 205 and 220 grams dry weight per quart. The carbohydrate of the tomato is listed separately in the table above.

Also the carrageenin, guar, or like gum, is either reduced in amount or omitted entirely.

The total content of stabilizing gum of kind described admixed as such and of pectin supplied with the tomato is selected so that the gelling tendency is avoided and the viscosity of the food is established within the range stated, namely 75–200 cp.s at 45° F. for the cold stored food.

If these changes from Example 1 are not made particularly in the reduction of the pectin content of the tomato flavoring used, the finished fluid food is not acceptable to the trade because of incipient gelling or unsatisfactorily low flowability when the liquid food is refrigerated previous to use.

While the compositions described are adapted particularly well for distribution to the consumer or the retail store under refrigeration similar to fluid milk, the compositions have been found to preserve their desirable taste and not to coagulate or precipitate during or after subjection to high temperature sterilization. For this reason they are adapted to sterilization at such temperatures for short times, cooling and then canning in previously sterilized containers under aseptic conditions.

EXAMPLE 5

In practicing this sterilization and canning procedure, the composition of Example 1, for instance, is used as follows:

It is subjected to heat sterilization at temperatures and times that produce sterilization equivalent to $F_0$ 10–20, all by conventional technique, cooled to approximately room temperature and then canned under aseptic conditions, the temperature of the sterilization being preferably in the range 270°–290° F.

There is no deterioration such as results from like treatment of fluid milk. Our canned product remains stable when held for several months' storage at room temperature.

EXAMPLE 6

The procedure of any of the Examples 1–4 are followed except that the finished compounded liquid food is subjected to quick freezing under conditions that are conventional in quick freezing fruit juice or the like.

The quick frozen material may be stored in frozen form and thawed at the time of use, with preservation of the desirable properties and flavor of the product.

EXAMPLE 7

The composition and procedure of Examples 1–4 are followed except that the finished liquid food is subjected to spray drying under conditions that are usual for the spray drying of fluid milk.

During the spray drying, the components remain intimately associated. The powder so produced is reconstitutable by stirring in cold water.

It will be understood that it is intended to cover all changes and modifications of the examples of the invention herein chosen for the purpose of illustration which do not constitute departures from the spirit and scope of the invention.

We claim:

1. A liquid food for human consumption comprising an aqueous dispersion of mixed protein, carbohydrates and fat, the protein being water dispersible and selected from the group consisting of milk, meat, egg, and degraded and aminoacid-fortified soy and peanut proteins, the fat being selected from the group consisting of milk fat, soybean oil and corn oil, the proportions by weight being about 650–1,000 parts of carbohydrates and 300–600 parts of protein for 100 parts of the fat, the carbohydrates being in proportion to provide at least 475 calories for an amount of the liquid food providing a total of 900 calories, the carbohydrate including a mixture of 5–50 grams of soluble dextrin, 60–90 grams of lactose, and 2–20 grams total of dextrose and maltose for said amount of the liquid food, and the protein being at least half milk protein.

2. The food of claim 1 including 20–45 grams of sucrose for the said amount of the food.

3. The food of claim 1 including admixed tomato pulp as flavoring material, the said pulp including pectin in the amount of not more than 0.1% of the dry weight of the food.

4. The food of claim 1, said protein consisting entirely of milk protein.

5. The food of claim 1, said fat being milk fat.

References Cited by the Examiner

UNITED STATES PATENTS 3,097,947　7/1963　Kemmerer _____ 99—63

FOREIGN PATENTS 435,034　9/1935　Great Britain.

OTHER REFERENCES

Annals of Internal Medicine, Feinstein et al., vol. 48, No. 2, February 1958, pages 330–343.

Bailey: "Industrial Oil and Fat Products," publ. by Interscience, N.Y., 1945, pp. 134, 139, 154, 172, relied on.

Modern Drugs, March 1960, p. 1361.

Newburgh: Archives of Internal Medicine, vol. 70, July, December 1942, pp. 1033–1096, pp. 1087 to 1096 relied on.

A. LOUIS MONACELL, *Primary Examiner.*

TOBIAS E. LEVOW, *Examiner.*